(12) United States Patent
Kim et al.

(10) Patent No.: US 11,456,007 B2
(45) Date of Patent: Sep. 27, 2022

(54) END-TO-END MULTI-TASK DENOISING FOR JOINT SIGNAL DISTORTION RATIO (SDR) AND PERCEPTUAL EVALUATION OF SPEECH QUALITY (PESQ) OPTIMIZATION

(71) Applicant: Samsung Electronics Co., Ltd., Gyeonggi-do (KR)

(72) Inventors: Jaeyoung Kim, San Diego, CA (US); Mostafa El-Khamy, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 232 days.

(21) Appl. No.: 16/451,969

(22) Filed: Jun. 25, 2019

(65) Prior Publication Data
US 2020/0227070 A1 Jul. 16, 2020

Related U.S. Application Data

(60) Provisional application No. 62/791,421, filed on Jan. 11, 2019.

(51) Int. Cl.
*G10L 25/30* (2013.01)
*G10L 21/02* (2013.01)
(Continued)

(52) U.S. Cl.
CPC ............ *G10L 25/60* (2013.01); *G10L 15/063* (2013.01); *G10L 21/0208* (2013.01)

(58) Field of Classification Search
CPC . G10L 21/0208; G10L 21/0232; G10L 25/30; G10L 25/60; G10L 21/0224
See application file for complete search history.

(56) References Cited

U.S. PATENT DOCUMENTS 7,412,375 B2 * 8/2008 Goldstein ............... G10L 25/69
704/228
10,839,822 B2 * 11/2020 Chen .................... G06N 3/0445
(Continued)

FOREIGN PATENT DOCUMENTS

WO  WO 2013/106187    7/2013
WO  WO 2017/218492    12/2017

OTHER PUBLICATIONS

Martin-Donas et al, "A deep learning loss function based on the perceptual evaluation of the speech quality", Sep. 2018, In IEEE Signal processing letters. Sep. 19, 2018;25(11):1680-4.*

(Continued)

*Primary Examiner* — Olujimi A Adesanya
(74) *Attorney, Agent, or Firm* — The Farrell Law Firm, P.C.

(57) ABSTRACT

A method and system for providing end-to-end multi-task denoising for joint signal distortion ratio (SDR) and perceptual evaluation of speech quality (PESQ) optimization is herein disclosed. According to one embodiment, an method includes receiving a noisy signal, generating a denoised output signal, determining a signal distortion ratio (SDR) loss function based on the denoised output signal, determining a perceptual evaluation of speech quality (PESQ) loss function based on the denoised output signal, and optimizing an overall loss function based on the PESQ loss function and the SDR loss function.

19 Claims, 6 Drawing Sheets

(51) Int. Cl.
*G10L 25/60* (2013.01)
*G10L 21/0208* (2013.01)
*G10L 15/06* (2013.01)

(56) References Cited

U.S. PATENT DOCUMENTS

| | | | | |
|---|---|---|---|---|
| 2011/0305345 | A1* | 12/2011 | Bouchard | G10L 21/0208 704/226 |
| 2012/0143601 | A1 | 6/2012 | Beerends et al. | |
| 2013/0064383 | A1 | 3/2013 | Schnell et al. | |
| 2013/0197904 | A1* | 8/2013 | Hershey | G10L 21/0216 704/226 |
| 2013/0219048 | A1 | 8/2013 | Arvidsson et al. | |
| 2016/0007130 | A1* | 1/2016 | Germain | G06F 17/16 381/58 |
| 2017/0032803 | A1* | 2/2017 | Pandey | G10L 21/0232 |
| 2017/0270946 | A1* | 9/2017 | Kaniewska | G10L 25/93 |
| 2017/0345433 | A1* | 11/2017 | Dittmar | G10L 21/0272 |
| 2019/0005976 | A1* | 1/2019 | Peleg | G06K 9/00228 |
| 2019/0066713 | A1* | 2/2019 | Mesgarani | G10L 17/26 |
| 2019/0132687 | A1* | 5/2019 | Santos | G10L 25/30 |
| 2019/0318754 | A1* | 10/2019 | Le Roux | G10L 19/06 |

OTHER PUBLICATIONS

Erdogan et al, "Investigations on Data Augmentation and Loss Functions for Deep Learning Based Speech-Background Separation", Sep. 2018, InInterspeech Sep. 2018 (pp. 3499-3503).*

Choi et al, "Phase-aware speech enhancement with deep complex u-net", Sep. 2018 InInternational Conference on Learning Representations Sep. 27, 2018, pp. 1-20.*

Venkataramani et al, "Adaptive front-ends for end-to-end source separation", Dec. 2017, InProc. NIPS Dec. 2017. pp. 1-5.*

Le Roux et al, "SDR—half-baked or well done?", 2018, Mitsubishi Electric Research Laboratories (MERL), Cambridge, MA, USA, Tech. Rep., 2018.*

Wichern et al, "Phase reconstruction with learned time-frequency representations for single-channel speech separation", Sep. 2018, In 2018 16th International Workshop on Acoustic Signal Enhancement (IWAENC) Sep. 17, 2018 (pp. 396-400). IEEE.*

Wang et al, "End-to-end speech separation with unfolded iterative phase reconstruction", arXiv preprint arXiv:1804.10204. Apr. 26, 2018.*

Fu et al, "End-to-end waveform utterance enhancement for direct evaluation metrics optimization by fully convolutional neural networks", Apr. 2018, IEEE/ACM Transactions on Audio, Speech, and Language Processing. Apr. 5, 2018;26(9):1570-84.*

Elbaz D, Zibulevsky M, "Speech Signals Frequency Modulation Decoding via Deep Neural Networks", 2018, (Doctoral dissertation, Computer Science Department, Technion), pp. 1-68.*

Kim et al, "End-to-end multi-task denoising for the joint optimization of perceptual speech metrics", Oct. 2019, arXiv preprint arXiv: 1910.10707. Oct. 23, 2019.*

Zhao, Yan et al., "Perceptually Guided Speech Enhancement Using Deep Neural Networks", ICASSP 2018, Copyright 2018 IEEE, pp. 5074-5078.

Kim, Jaeyoung et al., End-to-End Multi-Task Denoising for Joint SDR and PESQ Optimization, arXiv preprint arxiv:1901.09146. Jan. 26, 2019, pp. 10.

* cited by examiner

END-TO-END MULTI-TASK DENOISING FOR JOINT SIGNAL DISTORTION RATIO (SDR) AND PERCEPTUAL EVALUATION OF SPEECH QUALITY (PESQ) OPTIMIZATION

PRIORITY

This application is based on and claims priority under 35 U.S.C. § 119(e) to a U.S. Provisional Patent Application filed on Jan. 11, 2019 in the United States Patent and Trademark Office and assigned Ser. No. 62/791,421, the entire contents of which are incorporated herein by reference.

FIELD

The present disclosure is generally related to signal processing. In particular, the present disclosure is related to signal distortion ratio (SDR) and perceptual evaluation of speech quality (PESQ) optimization.

BACKGROUND

Supervised learning based on a deep neural network recently has achieved substantial improvement on speech enhancement. The key difference from typical statistical approaches is that no prior assumptions on signal models are necessary. For example, a Wiener filter typically assumes Gaussian distributions for speech or noise models, which frequently is not true in real environments. On the contrary, a neural network learns speech denoising only by referencing mapping from noisy speech to clean speech from training data.

Spectra mask estimation includes predicting a time-frequency spectra mask, which is the ratio between clean and noisy spectra. An ideal binary mask (IBM) has previously been proposed for training labels, where IBM is either one or zero depending on the corresponding signal to noise ratio (SNR). An ideal ratio mask (IRM) and an ideal magnitude mask (IAM) provided soft mask labels to overcome coarse mapping of IBM. Both of them showed improvement over IBM due to finer label resolutions. Also, a phase sensitive mask (PSM) was previously proposed which takes into account a clean and noisy phase. PSM does not compensate noisy phase but by referencing clean and noisy phase ratio, it provides better spectra amplitude labels for the mask estimation.

However, such approaches have two critical issues: metric mismatch and spectra mismatch. Spectra mask estimation typically minimizes the mean square error (MSE) between clean and estimated spectra amplitude, which is not optimal in maximizing signal distortion ratio (SDR) or perceptual evaluation of speech quality (PESQ) due to the metric mismatch. For example, it is frequently observed that in spite of decreased spectra mean square errors, SDR or PESQ are often degraded. The second spectra mismatch issue comes from estimation in spectra domain. In general, any arbitrary modification of spectra signal cannot be perfectly recovered due to short-time Fourier transform (STFT) and inverse short-time Fourier transform (ISTFT) operations, which is also known as STFT inconsistency. For example, the denoised spectra is, in general, not matched to the spectra amplitude of the recovered waveform. Therefore, the denoised spectra amplitude cannot be fully reflected to the reconstructed output, which can lead to substantial performance loss.

SUMMARY

According to one embodiment, a method of training a neural network includes receiving a noisy signal, generating a denoised output signal, determining a signal distortion ratio (SDR) loss function based on the denoised output signal, determining a perceptual evaluation of speech quality (PESQ) loss function based on the denoised output signal, and optimizing an overall loss function based on the PESQ loss function and the SDR loss function.

According to one embodiment, a system for training a neural network includes a memory, and a processor configured to receive a noisy signal, generate a denoised output signal, determine an SDR loss function based on the denoised output signal, determine a PESQ loss function based on the denoised output signal, and optimize an overall loss function based on the PESQ loss function and the SDR loss function.

According to one embodiment, a method for training a neural network includes receiving a noisy signal, generating a denoised output signal, and determining a PESQ loss function based on the denoised output signal.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
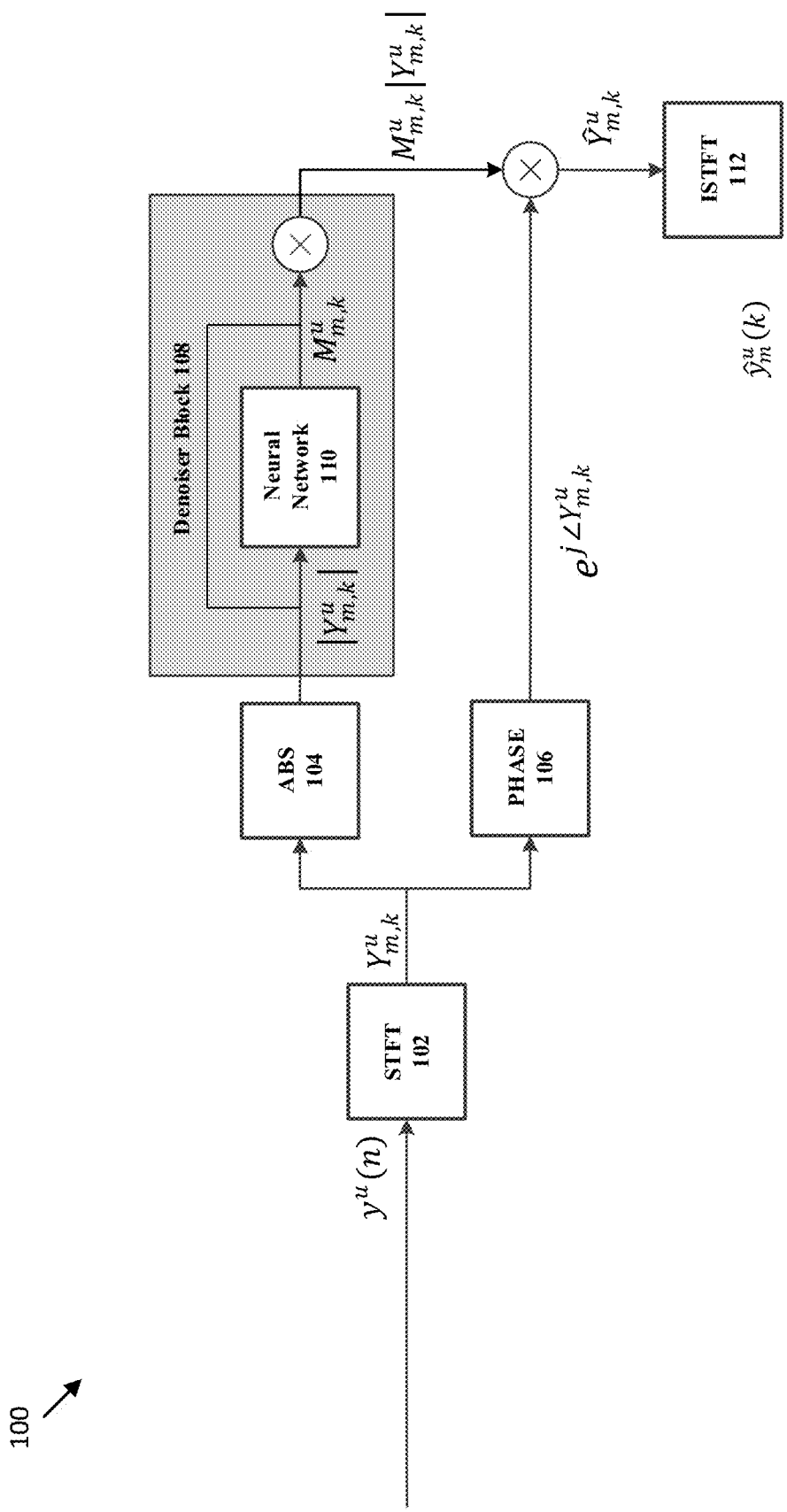
FIG. 1 is a diagram of a denoising system, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present system and method provide end-to-end multi-task denoising for joint signal distortion ratio (SDR) and perceptual evaluation of speech quality (PESQ) optimization. The framework includes a loss function fully correlated with PESQ and SDR that can effectively avoid a metric mismatch issue. The loss function may be divided into two terms: SDR loss and PESQ loss. The SDR loss uses scale-invariant SDR as a loss function as in Equation (1).

$$SI-SDR = 10\log_{10} \frac{\left\|\frac{x^T \hat{y}}{\|x\|^2}x\right\|^2}{\left\|\frac{x^T \hat{y}}{\|x\|^2}x - \hat{y}\right\|^2} = 10\log_{10} \frac{\|\alpha x\|^2}{\|\alpha x - \hat{y}\|^2}, \quad (1)$$

$$\alpha = \underset{\alpha}{\mathrm{argmin}} \|\alpha x - \hat{y}\|^2$$

PESQ loss is designed to approximate symmetric and asymmetric disturbance of PESQ. The approximated terms are minimized to optimize PESQ during training.

Furthermore, supervised learning is performed on the denoised time-domain speech after an inverse short-time Fourier transform (ISTFT). Unlike spectra mask estimation, loss minimization is not performed on the spectra domain. Therefore, the framework does not have spectra mismatch. The present system and method for end-to-end multi-task denoising significantly improves PESQ and SDR. The present system and method performs optimization after the ISTFT domain to resolve spectra mismatch using a scale-invariant SDR metric as a loss function and a modified PESQ metric to be combined with the SDR for joint optimization of PESQ and SDR.

FIG. 1 is a diagram 100 of a denoising system, according to an embodiment. The system 100 includes a short-time Fourier transform (STFT) block 102, an absolute value (ABS) block 104, a phase extraction block 106, a denoiser block 108 that includes a neural network 110, and an ISTFT block 112. The noisy input signal $y^u(n)$ is modeled as in Equation (2):

$$y^u(n) = x^u(n) + n^u(n) \quad (2)$$

where u is utterance index, n is time index, $x^u(n)$ is clean speech and $n^u(n)$ is noise signal. The noisy input signal $y^u(n)$ is then grouped to generate $y_w^u(m)$ as in Equation (3):

$$y_m^u(k) = w(k)y^u(k - m\Delta), 0 \leq k \leq K \quad (3)$$

where m is a frame index, $\Delta$ is the size of frame shift, K is the size of each frame and w(k) is a window function. For example, K is 1024 and $\Delta$ is 256, such that each frame is 75% overlapped with the next frame.

After the STFT 102, $Y_{m,k}^u$ is fed into two separate paths. For the upper path, the magnitude of $Y_{m,k}^u$ is extracted at the ABS block 104 and is passed to the denoiser block 108 for spectra amplitude denoising. The phase of $Y_{m,k}^u$ is extracted with the phase extractor 106 at the lower path and used to synthesize complex spectra $\bar{Y}_{m,k}^u$ with denoised spectra amplitude. The time-domain denoised output $\bar{y}^u(n)$ is reconstructed after the ISTFT 112, which is composed of inverse fast Fourier transform (IFFT), windowing and overlap add operations.

Figure 2:
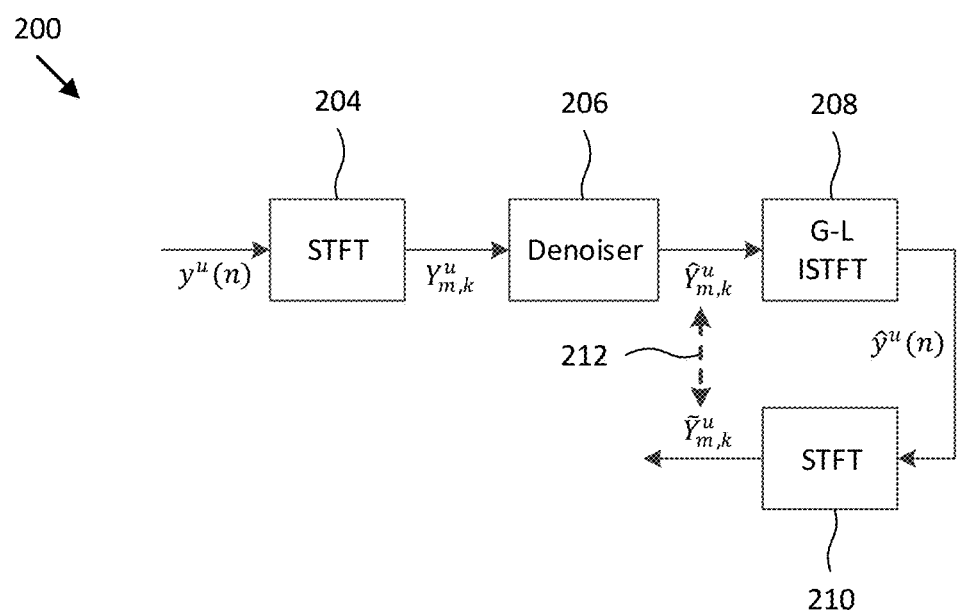
FIG. 2 is a diagram illustrating issues on amplitude spectrum optimization.

FIG. 2 is a diagram 200 illustrating issues on amplitude spectrum optimization. The system includes an STFT block 204, a denoiser block 206, a Griffin-Lim (GL) ISTFT block 208, and an STFT block 210. In general, there is an amplitude spectrum mismatch 212 after the ISTFT block 208. The denoiser output, $\tilde{Y}_{m,k}^u$ is not matched to $\hat{\tilde{Y}}_{m,k}^u$, where $\hat{\tilde{Y}}_{m,k}^u$ is STFT of the reconstructed signal $\bar{y}^u(n)$. The GL ISTFT is used to find $\bar{y}^u(n)$ to minimize MSE of two complex spectra. Due to this STFT inconsistency, the estimated $\tilde{Y}_{m,k}^u$ cannot fully reflected into true spectrum $\hat{\tilde{Y}}_{m,k}^u$.

Additionally, the MSE of the amplitude spectrum is not optimal in SDR and PESQ because the MSE treats all time-frequency bins equally. SDR and PESQ apply non-linear mapping to time or spectrum signals to generate an unequally weighted error average. Thus, correct loss functions need to be used to minimize the SDR and the PESQ.

Figure 3:
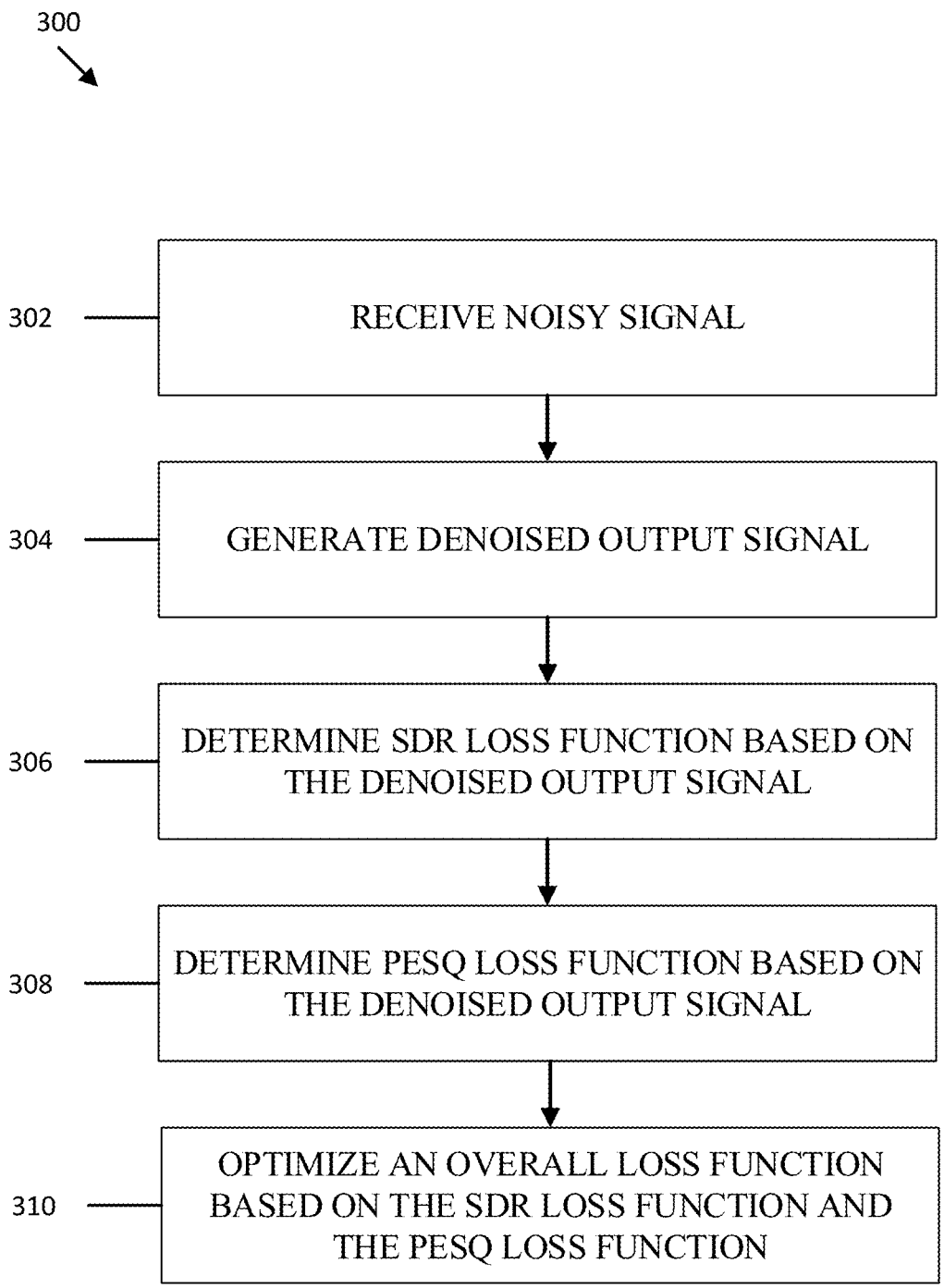
FIG. 3 is a flowchart of a method for training a neural network to maximize SDR and PESQ, according to an embodiment.

FIG. 3 is a flowchart 300 of a method for training a neural network to maximize SDR and PESQ, according to an embodiment. At 302, the system receives a noisy signal, and at 304 the system generates a denoised output signal, as described above with respect to FIGS. 1 and 2.

Figure 4:
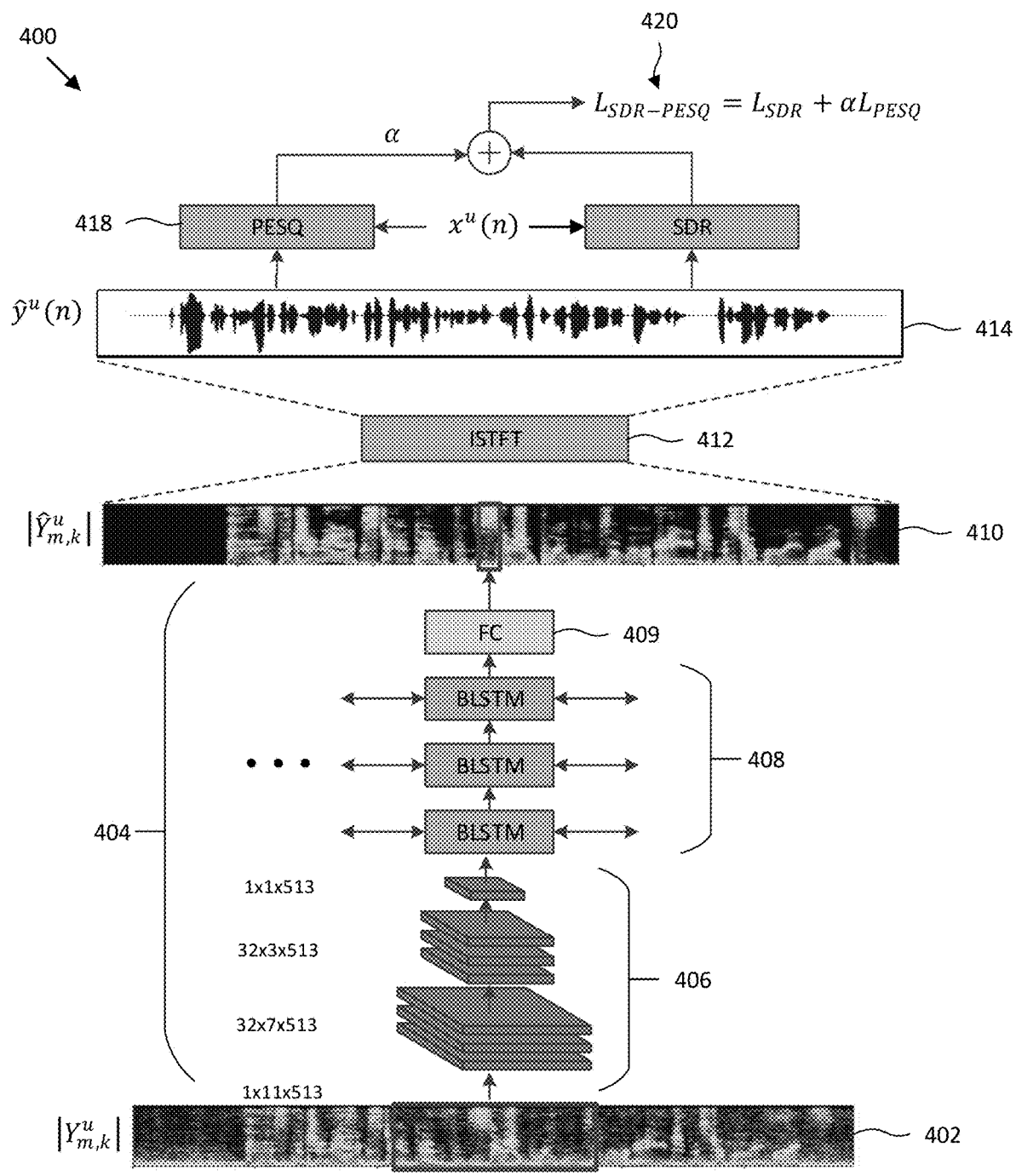
FIG. 4 is a diagram of an optimization network system, according to an embodiment.

At 306, the system determines an SDR loss function based on the denoised output signal. FIG. 4 is a diagram of an optimization network system 400, according to an embodiment. The system 400 is based on a convolutional neural network bi-directional long-short term memory (CNN-BLSTM) network 404. CNN-BLSTM is one example of denoiser networks and other types of networks such as CNN-based denoising auto-encoder. The CNN-BLSTM 404 includes 3 convolutional layers 406, 3 bidirectional LSTMs (BLSTM) 408 (where the double sided arrows represent bi-directional sweeping in the BLSTM 408), and fully-connected (FC) layers 409. A noisy spectra amplitude $|Y_{m,k}^u|$ 402 with 513 frequency bins and 11 frames of context window is fed into the convolutional layers 406 with kernel size of 5×5. The dilated convolution is applied to the second and third layers with dilation rate of 2 and 4. Dilated convolution is only applied to the frequency dimension because time correlation will be learned by BLSTMs 408. An output 410 of the CNN-BLSTM is also a time-frequency mask. $|\hat{Y}_{m,k}^u|$ may be referred to as a product of the CNN-BLSTM mask output with the noisy spectra amplitude 402.

The estimated spectra $\hat{Y}_{m,k}^u$ is transformed to $\bar{y}^u(n)$ by a GL ISTFT 412 as in Equations (4) and (5).

$$\hat{y}_m^u(n) = IFFT\,[\hat{Y}_{m,k}^u](n) \tag{4}$$

$$\hat{y}^u(n) = \sum_{m=0}^{M-1} \hat{y}_m^u(n - m\Delta)w_{GL}(n - m\Delta) \tag{5}$$

The system 400 generates a denoised output 414, which is then used to determine a SDR loss function 416. Since $\bar{y}^u(n)$ is a time-domain signal, SDR can be directly optimized with the SDR loss function as in Equations (6) and (7):

$$L_{SDR} = \sum_{u=0}^{B-1} 20\log_{10} \frac{\sum_{n=0}^{N_u-1}(\alpha^u x^u(n))^2}{\sum_{n=0}^{N_u-1}(\hat{y}^u(n) - \alpha^u x^u(n))^2} \tag{6}$$

$$\alpha^u = \frac{\sum_{n=0}^{N_u-1} x^u(n)\hat{y}^u(n)}{\sum_{n=0}^{N_u-1} (x^u(n))^2} \tag{7}$$

where $a^u$ is included as a part of the training factor. Since $L_{SDR}$ is the average SDR of batch utterances, there is no metric mismatch with SDR metric. The optimization does not have a spectra mismatch issue because the optimization is performed after the GL transform. As long as the CNN-BLSTM 404 is well trained to minimize $L_{SDR}$, mismatch between the denoiser spectra output and STFT of the reconstructed signal does not matter.

At 408, the system determines a PESQ loss function 418 based on the denoised output signal 414. The SDR loss function 416 and the PESQ loss function 418 will later be used to optimize the overall loss function 420. The end-to-end training maximizes SDR by reconstructing a time-domain signal from the GL transform. Although the loss function $L_{SDR}$ can be optimal in maximizing SDR metric, there is still metric mismatch issue with the PESQ because frame disturbance metric defined in the PESQ does not necessarily decrease with the lower $L_{SDR}$. For example, if the SDR significantly improves on the high frequency region and slightly degrades on lower frequency parts, the overall SDR can enhance the signal but PESQ might get degraded due to higher weighting on lower frequency bins. Therefore, as in SDR optimization, it is best to directly maximize PESQ metric to avoid metric mismatch.

Figure 5:
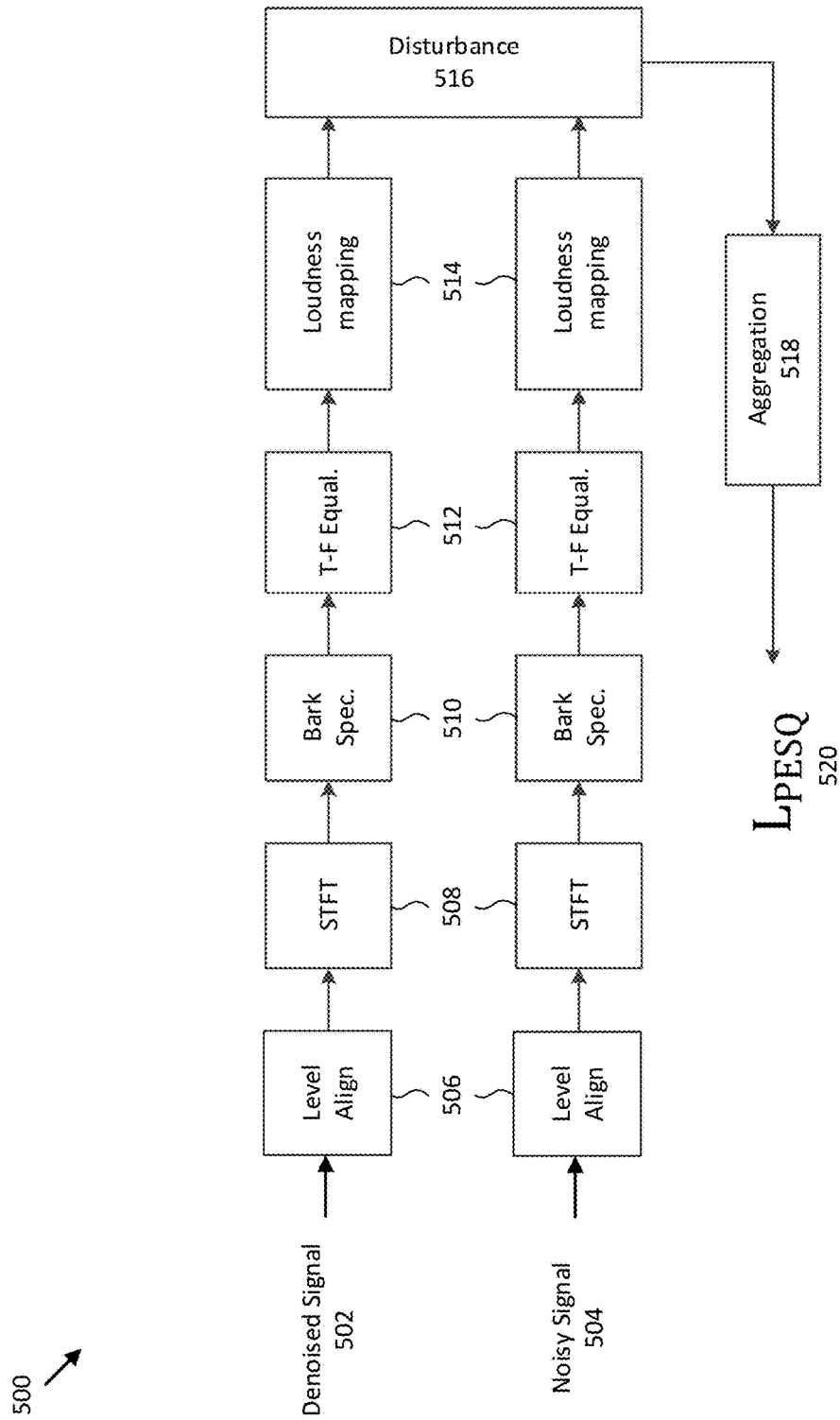
FIG. 5 is a diagram of a system for determining the PESQ loss function, according to an embodiment.

FIG. 5 is a diagram of a system 500 for determining the PESQ loss function, according to an embodiment. There are several modifications to system 500 versus ordinary PESQ loss function determining systems to enable back-propagation and remove unnecessary operations for reducing complexity. First, an infinite impulse response (IIR) filter is removed because time evolution of the IIR filter is so deep (more than hundreds of thousands) and therefore, it is infeasible for back-propagation. Second, delay adjustment routine is removed because delay aligned data is prepared for training. Finally, a bad-interval iteration was removed. PESQ improves metric calculations by detecting bad intervals of frames and updating metrics over those periods. As long as training clean and noisy data pairs are time-aligned, there is no significant impact on PESQ by removing this operation.

The system receives a denoised signal 502, as well as a noisy signal 504, and performs level alignment 506 on the denoised signal 502 and the noisy signal 504. The average power of denoised and noisy signals ranging from 300 Hz and 3 KHz are aligned to be pre-defined value of 10^7. IIR filter models handset listening environment with the frequency response of an intermediate reference system (IRS) receive characteristics.

The system 500 performs an STFT 508 on the level aligned signals on both paths of the system 500 and then applies the Bark spectrum frequency 510 on the linear spectrum input signals on both paths of the system 500. The Bark spectrum analysis 510 finds the mean of linear scale frequency bins according to the Bark scale mapping. The higher frequency bins are averaged with a greater number of bins, which effectively provides lower weighting to them. The mapped Bark spectrum power can be formulated as in Equation (8):

$$B_{c,m,i}^u = \frac{1}{I_{i+1} - I_i} \sum_{k=I_i}^{I_{i+1}-1} |Y_{m,k}^u|^2 \quad (8)$$

where $l_i$ is the start of linear frequency bin number for the $i^{th}$ bark spectrum, $|Y_{m,k}^u|$ is STFT spectrum magnitude of the denoised signal 502 and $B_{c,m,i}^u$ is $i^{th}$ bark spectrum power of the denoised signal 502. $B_{n,m,i}^u$ is a bark spectrum power of the noisy signal and can be found the same as in Equation (8).

The system 500 then performs time-frequency equalization (T-F Equal) 512 on the Bark spectrum power on both paths of the system 500. Each bark spectrum of the denoised signal 502 is firstly compensated by average power ratios between the denoised and noisy bark spectrums as in Equation (9):

$$E_{c,m,i}^u = \frac{P_{n,i}^u + c_1}{P_{c,i}^u + c_1} B_{c,m,i}^u \quad (9)$$

where $$P_{n,i}^u = \frac{1}{M_u} \sum_{m=0}^{M_u-1} B_{n,m,i}^u S_{n,m,i}^u, \quad P_{c,i}^u = \frac{1}{M_u} \sum_{m=0}^{M_u-1} B_{c,m,i}^u S_{n,m,i}^u$$

and c is a constant. $S_{n,m,i}^u$ and $S_{c,m,i}^u$ are silence masks that become 1 only when the corresponding bark spectrum power exceeds thresholds. After frequency equalization, the short-term gain variation of a noisy bark spectrum is compensated for each frame as in Equations (10), (11) and (12):

$$S_m^u = \frac{G_{c,m}^u + c_2}{G_{n,m}^u + c_2} \quad (10)$$

$$S_m^u = 0.2 S_{m-1}^u + 0.8 S_m^u \quad (11)$$

$$E_{n,m,i}^u = S_m^u B_{n,m,i}^u \quad (12)$$

where $$G_{n,m}^u = \frac{1}{I} \sum_{i=0}^{I} B_{n,m,i}^u, \quad G_{c,m}^u = \frac{1}{I} \sum_{i=0}^{I} E_{c,m,i}^u$$

and $c_2$ is a constant.

The system 500 then performs loudness mapping 514 on the compensated signal on both paths of the system 500. The power densities are transformed to a Sone loudness scale using Zwicker's law as in Equation (13):

$$L_{x,m,i}^u = S_i \left(\frac{P_{0,i}}{0.5}\right)^r \left[\left(0.5 + 0.5 \frac{E_{x,m,i}^u}{P_{0,i}}\right)^r - 1\right] \quad (13)$$

where $P_{0,i}$ is the absolute hearing threshold, $S_i$ is the loudness scaling factor, and r is Zwicker power and x can be c (denoised) or n (noisy).

The system 500 then performs disturbance processing 516 on the mapped signal on both paths of the system 500. The raw disturbance metric is difference between denoised and noisy loudness densities and then is further processed as in Equations (14) and (15).

$$DZ_{m,i}^u = 0.25 \min(L_{c,m,i}^u, L_{n,m,i}^u) \quad (14)$$

$$D_{m,i}^u = \max(L_{c,m,i}^u - L_{n,m,i}^u - DZ_{m,i}^u, 0) + \min(L_{c,m,i}^u - L_{n,m,i}^u + DZ_{m,i}^u, 0) \quad (15)$$

If the absolute difference between denoised and noisy loudness densities are less than 0.25 of minimum of two densities, raw disturbance becomes zero. The symmetric frame disturbance is then calculated with L2 norm operations as in Equation (16):

$$FD_m^u = \sum_i^I w_i \sqrt{\frac{1}{\sum_i w_i} \sum_{i=0}^I (W_i D_{m,i}^u)^2} \quad (16)$$

where $w_i$ is the pre-defined weighting for bark spectrum bins. For the asymmetric frame disturbance, raw disturbance is weighted by ratio between noisy and denoised spectra powers with saturation and thresholding as in Equations (17), (18) and (19).

$$h_{m,i}^u = \left(\frac{B_{n,m,i}^u + 50}{B_{c,m,i}^u + 50}\right)^{1.2} \quad (17)$$

$$h_{m,i}^u = \begin{cases} 12 & \text{if } h_{m,i}^u > 12 \\ 0 & \text{if } h_{m,i}^u < 3 \end{cases} \quad (18)$$

$$AFD_m^u = \sum_i^I w_i \sqrt{\frac{1}{\sum_i w_i} \sum_{i=0}^I (W_i D_{mi}^u h_{m,i}^u)^2} \quad (19)$$

The system 500 then determines the PESQ Loss function $L_{PESQ}$ 520 through aggregation 518 of the disturbance. $L_{PESQ}$ can be found by two-step frame disturbance averaging, as in Equations (20), (21), (22) and (23):

$$PSQM_s^u = \sqrt[6]{\frac{1}{20} \sum_{i=0}^{20} (FD_{10s+i}^u)^6} \quad (20)$$

$$d_{sym} = \sum_{u=0}^{B-1} \sqrt{\frac{1}{S} \sum_{s=0}^{S_u-1} (PSQM_s^u)^2} \quad (21)$$

$$APSQM_s^u = \sqrt[6]{\frac{1}{20} \sum_{i=0}^{20} (AFD_{10s+i}^u)^6} \quad (22)$$

$$d_{asym} = \sum_{u=0}^{B-1} \sqrt{\frac{1}{S} \sum_{s=0}^{S_u-1} (APSQM_s^u)^2} \quad (23)$$

where $$S_u = \left\lfloor \frac{M_u}{10} \right\rfloor.$$

$L_{PESQ}$ 520 can be determined as in Equation (24).

$$L_{PESQ} = 4.5 - 0.1 d_{sym} - 0.0309 d_{asym} \quad (24)$$

At 310, the system optimizes an overall loss function based on the SDR loss function and the PESQ loss function. To simultaneously minimize $L_{PESQ}$ and $L_{SDR}$, the loss function combines two as in Equation (25):

$$L_{SDR-PESQ} = L_{SDR} + \alpha L_{PESQ} \qquad (25)$$

$$= \sum_{u=0}^{B-1} 20\log_{10} \frac{\sum_{n=0}^{N_u-1}(\alpha^u x^u(n))^2}{\sum_{n=0}^{N_u-1}(\hat{y}^u(n) - \alpha^u x^u(n))^2} +$$

$$\alpha \sum_{u=0}^{B-1} \sqrt{\frac{1}{S}\sum_{s=0}^{S_u-1}(PSQM_s^u)^2}$$

where $\alpha$ is a hyperparameter. Table 1 represents a performance comparison between different schemes, where SDR-PESQ is the denoising method disclosed herein.

TABLE 1

| Estimation | $SDR_{dB-avg}$ | PESQ |
|---|---|---|
| Noise Input | 5.80 dB | 1.267 |
| IAM | 11.91 dB | 1.822 |
| PSM | 12.08 dB | 1.857 |
| SDR | 12.43 dB | 1.699 |
| SDR-MSE | 12.44 dB | 1.758 |
| SDR-DIST | 12.59 dB | 1.953 |
| SDR-PESQ | 12.60 dB | 1.966 |

Figure 6:
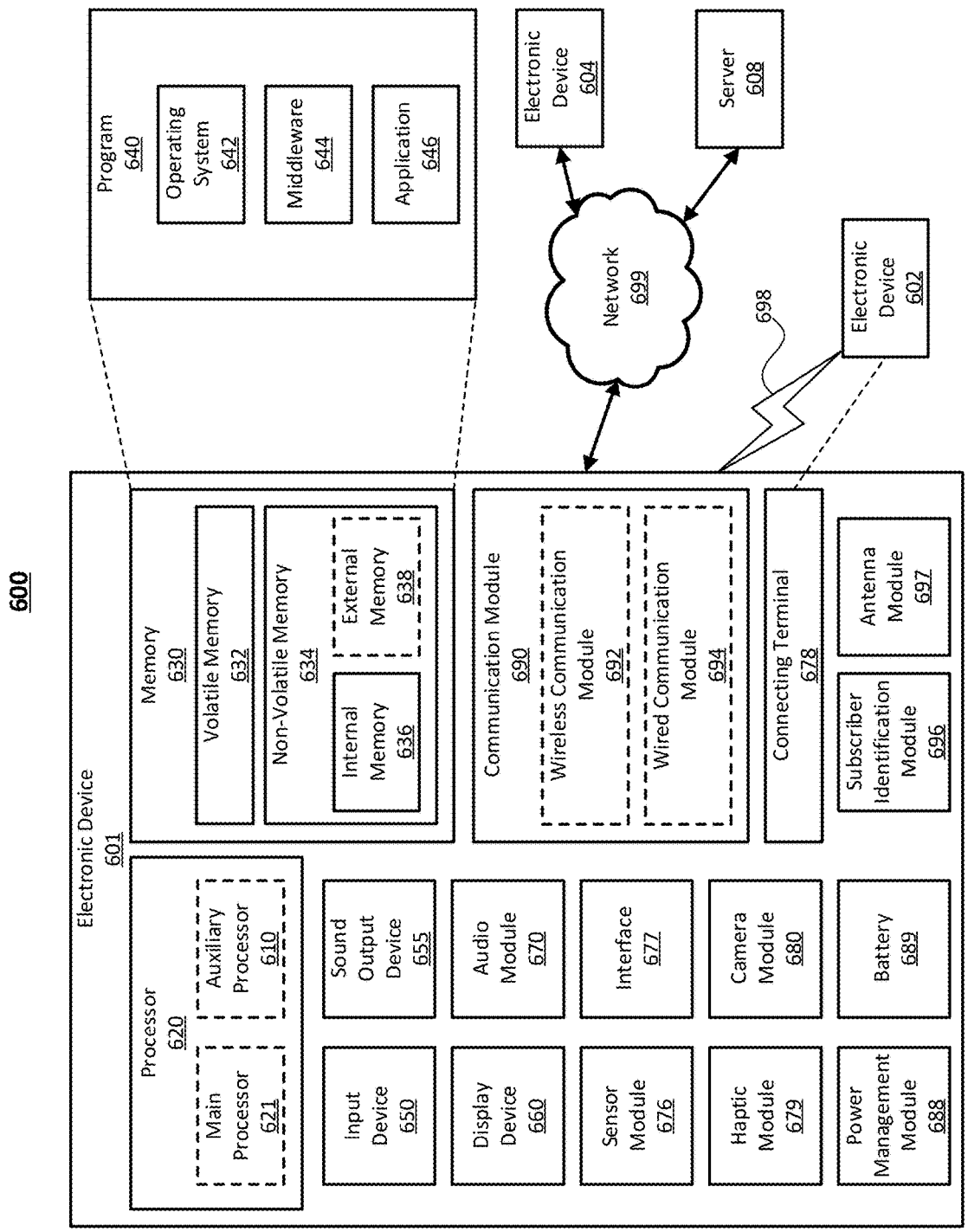
FIG. 6 is a block diagram of an electronic device in a network environment, according to one embodiment.

FIG. 6 is a block diagram of an electronic device 601 in a network environment 600, according to one embodiment. Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for training a neural network, comprising:
receiving a noisy signal and performing short-term Fourier transform (STFT) on the noisy signal;
generating a denoised output signal from the noisy signal and performing inverse short-term Fourier transform (ISTFT) on the denoised output signal;
determining a signal distortion ratio (SDR) loss function based on the denoised output signal after the ISTFT, wherein the SDR loss function uses a scale invariant (SI) SDR metric minimizing spectra mismatch;
determining a perceptual evaluation of speech quality (PESQ) loss function based on the denoised output signal after the ISTFT, wherein the PESQ loss function approximates symmetric and asymmetric disturbance of PESQ minimizing metric mismatch; and
optimizing an overall loss function based on the PESQ loss function and the SDR loss function.

2. The method of claim 1, wherein the PESQ loss function is further determined based on the noisy signal.

3. The method of claim 2, wherein determining the PESQ loss function further comprises performing level alignment on the noisy signal and the denoised output signal.

4. The method of claim 2, wherein determining the PESQ loss function further comprises applying a Bark spectrum frequency of the noisy signal and the denoised output signal.

5. The method of claim 4, wherein determining the PESQ loss function further comprises performing time-frequency equalization on the applied Bark spectrum frequency of the noisy signal and the denoised output signal.

6. The method of claim 2, wherein determining the PESQ loss function further comprises performing loudness mapping.

7. The method of claim 2, wherein determining the PESQ loss function further comprises performing disturbance processing.

8. The method of claim 1, wherein the overall loss function is optimized as a sum of the SDR loss function and the PESQ loss function multiplied by a hyperparameter.

9. A system for training a neural network, comprising:
a memory; and
a processor configured to:
receive a noisy signal and perform short-term Fourier transform (STFT) on the noisy signal;
generate a denoised output signal from the noisy signal and perform inverse short-term Fourier transform (ISTFT) on the denoised output signal;
determine a signal distortion ratio (SDR) loss function based on the denoised output signal after the ISTFT, wherein the SDR loss function uses a scale invariant (SI) SDR metric minimizing spectra mismatch;
determine a perceptual evaluation of speech quality (PESQ) loss function based on the denoised output signal after the ISTFT, wherein the PESQ loss function approximates symmetric and asymmetric disturbance of a PESQ minimizing metric mismatch; and
optimize an overall loss function based on the PESQ loss function and the SDR loss function.

10. The system of claim 9, wherein the PESQ loss function is further determined based on the noisy signal.

11. The system of claim 10, wherein the processor is further configured to determine the PESQ loss function by performing level alignment on the noisy signal and the denoised output signal.

12. The system of claim 10, wherein the processor is further configured to determine the PESQ loss function by applying a Bark spectrum frequency of the noisy signal and the denoised output signal.

13. The system of claim 12, wherein the processor is further configured to determine the PESQ loss function by performing time-frequency equalization on the applied Bark spectrum frequency of the noisy signal and the denoised output signal.

14. The system of claim 10, wherein the processor is further configured to determine the PESQ loss function by performing loudness mapping.

15. The system of claim 10, wherein the processor is further configured to determine the PESQ loss function by performing disturbance processing.

16. The system of claim 9, wherein the overall loss function is optimized as a sum of the SDR loss function and the PESQ loss function multiplied by a hyperparameter.

17. A method of training a neural network, comprising:
receiving a time-aligned pair of a noisy signal and a denoised signal;
performing short-term Fourier transform (STFT) on the noisy signal and the denoised signal;

generating a denoised output signal from the noisy signal and performing inverse short-term Fourier transform (ISTFT) on the denoised output signal;
determining a signal distortion ratio (SDR) loss function based on the denoised output signal after the ISTFT, wherein the SDR loss function uses a scale invariant (SI) SDR metric minimizing spectra mismatch;
performing disturbance processing on the noisy signal and the denoised signal;
determining a perceptual evaluation of speech quality (PESQ) loss function based on an aggregation of the disturbance processing, wherein the PESQ loss function approximates symmetric and asymmetric disturbance of PESQ minimizing metric mismatch; and
optimizing an overall loss function based on the PESQ loss function and the SDR loss function.

18. The method of claim 17, wherein the PESQ loss function is further determined based on the noisy signal.

19. The method of claim 18, wherein determining the PESQ loss function further comprises performing level alignment on the noisy signal and the denoised output signal.

* * * * *